(12) United States Patent
Jin et al.

(10) Patent No.: US 7,251,650 B2
(45) Date of Patent: Jul. 31, 2007

(54) METHOD, SYSTEM, AND ARTICLE OF MANUFACTURE FOR PROCESSING UPDATES TO INSERT OPERATIONS

(75) Inventors: Qi Jin, Cupertino, CA (US); Sriram Srinivasan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 10/648,008

(22) Filed: Aug. 25, 2003

(65) Prior Publication Data
US 2005/0050083 A1    Mar. 3, 2005

(51) Int. Cl.
G06F 17/30 (2006.01)
G06F 15/16 (2006.01)

(52) U.S. Cl. .................. 707/4; 707/101; 707/200; 707/204

(58) Field of Classification Search ........ 707/100–200, 707/1–4
See application file for complete search history.

(56) References Cited

U.S. PATENT DOCUMENTS

| | | | |
|---|---|---|---|
| 5,584,026 A * | 12/1996 | Knudsen et al. ............ 707/1 |
| 5,603,024 A | 2/1997 | Goldring |
| 5,684,990 A | 11/1997 | Boothby |
| 5,926,816 A | 7/1999 | Bauer et al. |
| 5,995,980 A | 11/1999 | Olson et al. |
| 6,421,658 B1 * | 7/2002 | Carey et al. ............... 707/2 |
| 6,442,543 B1 | 8/2002 | Snodgrass et al. |
| 6,505,200 B1 | 1/2003 | Ims et al. |
| 6,829,600 B2 * | 12/2004 | Gu et al. ................... 707/3 |
| 6,944,633 B1 * | 9/2005 | Higa et al. ............. 707/104.1 |
| 6,985,895 B2 * | 1/2006 | Witkowski et al. ........... 707/3 |
| 7,016,903 B1 * | 3/2006 | Thusoo et al. ............ 707/100 |
| 7,020,661 B1 * | 3/2006 | Cruanes et al. ......... 707/103 R |
| 2002/0111955 A1 | 8/2002 | Colby et al. |

FOREIGN PATENT DOCUMENTS

JP     2001022620 A2    2/2001

OTHER PUBLICATIONS

"Load and transform external data into Oracle 9i", by Akadia. Available online at http://www.akadia.com/services/ora_etl.html#The%20MERGE%20Statement.*

"Using Pipelined Table Functions (Oracle 9i)" by Toji Mammen George. Published Mar. 12, 2003. Available online at http://www.codeguru.com/cpp/data/mfc_database/oracle/article.php/c4285/.*

(Continued)

*Primary Examiner*—Jeffrey Gaffin
*Assistant Examiner*—Mark Andrew X Radtke
(74) *Attorney, Agent, or Firm*—Konrad Raynes & Victor LLP; Janaki K. Davoa

(57) ABSTRACT

A technique for processing input data is provided. Multiple input rows to beloaded into a first structure are received. Each input row of the multiple input rows is processed to classify each input row as one of an insert row and an update row, wherein input duplicates are stored in the first structure and index entries for the input duplicates are stored in a second structure. After the multiple input rows have been processed, the input duplicates are automatically re-applied to the first structure and the index entries stored in the second structure are processed.

24 Claims, 16 Drawing Sheets

OTHER PUBLICATIONS

"Oracle9i Database Daily Features Archives—August", by Oracle. Available online at http://www.oracle.com/technology/products/oracl9i/daily/aug2001.html.*

"MERGE Statement", available online at http://www.oracle.com/technology/products/oracle9i/daily/Aug24.html, Posted Aug. 24, 2001.*

U.S. Appl. No. 09/597,588, filed on Jun. 20, 2000, entitled "Technique for Enforcing Temporal Uniqueness in an Object/Relational Database Management System Environment," invented by C.M. Saracco.

IBM Corporation. *Table Management Utility. Reference Guide. IBM Brick Warehouse*. Chapter entitled Loading Data into a Warehouse Language (XML). Version 6.2, Aug. 2002, Part. No. 000-9055 [online] Retrieved from http:www-3.ibm.com/software/data/informix/pubs/library/interim/9055-pdf.html, 408 pages.

NCR Corporation. Teradata® Multiload Reference. Release Jul. 6, 2002. B035-2409-122A, Dec. 2002, 294 pages [online] Retrieved from http://www.info.ncr.com/temp/2409-122A185057.pdf.

IBM Corporation. *Using Red Brick Warehouse with IBM DB2 Warehouse Manager*, 6 pages [online] Retrieved from http://www7b.boulder.ibm.com/dmdd/zones/informix/library/techarticle/0301jin.html.

*Oracle 9i SQL Reference: MERGE*, 3 pages [online] Retrieved from http://download-west.oracle.com/docs/cd/B10501_01/server.920/a96540/statements_915a.htm#2080943.

\* cited by examiner

METHOD, SYSTEM, AND ARTICLE OF MANUFACTURE FOR PROCESSING UPDATES TO INSERT OPERATIONS

BACKGROUND OF THE INVENTION

1. Field of the Invention

The present invention is directed to processing update and insert operations applied against a relational database.

2. Description of the Related Art

Many database systems implement a special program referred to as a "loader" to transfer large volumes of data into a database. A loader loads tables, enforces referential integrity, builds indexes, and maintains materialized views defined on the table. For example, one loader program is a Red Brick® Table Management Utility (TMU) for the IBM® Red Brick® Warehouse, a relational database optimized for dimensional analysis. For more information on the TMU, see the IBM® RedBrick® Table Management Utility (TMU) Reference Guide Version 6.2 available from International Business Machines Corporation.

UPSERT operations may be performed to load data ("input rows") into a table. In a typical UPSERT operation, when an input row matches a primary key of an existing row in a table, that input row is designated as an update row and is used to update a matched existing row. When the input row has a new primary key, the input row is designated as an insert row and is inserted into the table. A primary key index entry is built for each input row that is inserted into the table. When the UPSERT operation is performed row by row for a set of input rows to be inserted into the table, with a primary key index entry built for each inserted row, the processing may become very slow due to the increased Input/Output (I/O) overhead for building each primary key index entry. For ease of reference, this row-by-row approach will be referred to herein as a "non-optimized UPSERT" operation.

An INSERT operation for an input row includes an insertion of the input row into a table, as well as, insertions into the indexes associated with that table. A non-optimized insertion would process input rows one by one, adding index entries one at a time. This causes random I/O access, which slows down the insert operation.

Instead of inserting index entries directly into an index, a technique (that will be referred to herein as an "optimized index inserting" technique for ease of reference) performs a delayed batch insertion. The optimized index inserting technique places new index entries, sorted in index primary key order, into, for example, a reserved memory area. These index entries may be referred to as "sorted index entries." For optimized building of multiple indexes, possibly in parallel, there may be multiple such index batches in, for example, individual memory areas.

Once a sufficient batch of index entries is collected, the different batches are then merged into their respective indexes. For the optimized index inserting technique, since the index modification is in key order (not random), the overhead is very small. Each index is associated with an index tree. An enhanced merge technique may build minisubtrees for the new index entries, which are then linked into the base index tree of the relevant index.

During the sort-merge operation, rows that violate the primary key constraint are identified, and are termed "duplicates." In particular, when a set of input rows are being processed, if a first row with a first primary key is received for which the primary key is not found in an associated index, the first row is inserted into the table, without adding a primary key for the row into the associated index. Then, if a second row with the first primary key (i.e., the same primary key as the first row) is received, it is determined that the primary key is not found in the associated index, and the second row is inserted into the table. These batch-sort-merge cycles repeat until the input rows are exhausted. When processing of a set of input rows is done, the first row remains in the table, and any rows in the table with the same primary key are termed "duplicate input rows" or "input duplicates." Then, the input duplicates are removed from the tables (because they were inserted into the tables already) along with any entries from corresponding non-unique indexes. The input duplicates may then be placed in a separate file (e.g., a "discard file" or a temporary discard table) for any investigations and/or processing desired by the user. That is, the optimized index inserting technique inserts the first row in a set of input duplicates and discards the remaining input duplicates.

Performance testing and customer feedback have indicated that the optimized index inserting technique, which is capable of being parallelized for multiple indexes, may be 20 times faster than a non-optimized index insertion.

Another technique will be referred to herein as an "optimized UPSERT" operation for ease of reference. The optimized UPSERT operation also improves the performance of UPSERT operations by performing index rebuilds for batches of inserted rows, rather than for each inserted row.

In particular, for optimized UPSERT operations, the input rows are a combination of new entries and updates to existing entries in a table. A lookup of the primary index is used to identify whether an input row is an insert (if no entries exist in the primary index) or whether its an update (if an entry already exists in the primary index). For a non-optimized UPSERT, all index entries are added or updated row by row, and no delayed batch indexing takes place.

For optimized UPSERT operations, if an input row is an update, indexes and the table data are immediately updated, and no delayed batching index building occurs. On the other hand, if the input row is identified as an insert row, the row data is inserted into the table immediately, but the index entries for insert rows are built with the optimized index inserting technique (i.e., the new index entries are added to a temporary index building space area and inserted into relevant indexes later as a batch operation).

The UPSERT operation observes the order of the input rows, i.e., for rows with the same primary key value, the values of the last such row are applied to the table last. This is to preserve the semantic of UPSERT operations that dictate that the later rows update previous data. A typical optimized UPSERT operation has a large percentage (e.g., 90%) of insertions and a smaller percentage of updates (e.g., 10%). The optimized UPSERT operation improves performance.

In optimized UPSERT operations, input duplicates, found during the sort-merge performed for the optimized index inserting for insert rows, are typically stored in discard files. However, the input duplicates are not really duplicates. Instead, the semantics of the input duplicates are very different than for simple INSERT operations. For optimized UPSERT operations, the input duplicates are updates to the previously inserted rows (i.e., "Updates to Inserts").

FIG. 1 illustrates tables used in an example of an UPSERT operation. For ease of reference, a table holding input rows may be referred to herein as an input table, and a table to which the input rows are applied may be referred to herein as an output table. Output table 100 has two columns A and B, with column A representing the primary key and column B holding other data. Before an UPSERT operation is performed, there is one row in output table 100. Input table 110 lists input rows that are to be processed by an UPSERT operation, and table 120 lists how the optimized UPSERT operation and the non-optimized UPSERT operation would characterize each input row.

If a non-optimized UPSERT operation (i.e., row-by-row processing) is performed, input rows (1,2) and (1,3) have the primary key value 1, and, because there already is a row (1,1) in the table with primary key value 1, there is a primary key match for input rows (1,2) and (1,3). Thus, input rows (1,2) and (1,3) are identified as update rows and are processed to update the existing row (1,1) directly. Also, input row (2,2) would be identified as an insert, and a primary key index entry would be built immediately. Therefore, input row (2,4) would have been correctly identified as an update to the existing row (2,2). Input row (3,3) would be identified as an insert, since there are no existing rows in output table 100 with a primary key value of 3. Output table 140 illustrates the table after the non-optimized UPSERT operation has been performed.

On the other hand, an optimized UPSERT operation would identify input rows (2,2), (2,4) and (3,3) as inserts, since there are no existing rows in output table 100 with a primary key value of 2 or 3, and would identify input rows (1,2) and (1,3) as updates. Moreover, rows (2,2) and (2,4) both have the same primary key value 2, and would be identified as input duplicates by the optimized UPSERT operation. In particular, with the optimized UPSERT operation, since a primary key match for input row (2,2) would not have been found, the input row would be identified as an insert, and the primary key entry for input row (2,2) would be placed in, for example, a sorting memory area. When row (2,4) is encountered, since the building of index entries has been delayed, the index entry for (2,2) would not have been merged into the index yet, and input row (2,4) would also be categorized as an insert and put into the sorting area. The fact that input rows (2,2) and (2,4) are duplicates is found out either while sorting the index entries or while these index entries are merged into the index. Both these input duplicates are categorized as insert rows.

Thus, there is a change of semantics for input row (2,4). Input row (2,4) had been initially categorized as an insert row, rather than as an update row, by the optimized UPSERT operation. The optimized UPSERT operation discards the input duplicates, except for the last one. That is, the optimized index building for UPSERT operations would have retained the last input row and discarded the previous rows as duplicates to retain the semantics of an UPSERT ('update') where the last change is preserved. On the other hand, the optimized index inserting for INSERT operations would have retained the first input row and discarded the rest as duplicates. So, for this example, the last row (2,4) would have been inserted, and the previous row (2,2) would have been discarded to a discard file by the optimized UPSERT operation. Output table 130 illustrates the table after the non-optimized UPSERT operation has been performed.

Discard of duplicates may work for INSERT operations, but not for UPSERT operations, because the input duplicates are really "updates to inserts" in the optimized UPSERT operation. Mis-categorizing "updates to inserts" as inserts could actually cause semantically incorrect results in various situations.

For example, when a "RETAIN" operation is used for a column, if an input row is an update row, the RETAIN operator for a column indicates that the existing value for that column should be kept. If the input row is an insert row, the column default value is used. This is a practical feature in real life, for example, where the starting date on a customer record, needs to be retained (i.e. never updated). If for example, there had been a RETAIN operator on column B in output table 100 of FIG. 1, for input duplicates (2,2) and (2,4), the result would need to be (2,2), not (2,4). Categorizing (2,4) as an insertion would thus pick value 4 instead of 2 for column B, which would be an error.

Also, aggregation operators (e.g., ADD, MAX, MIN etc.) may be specified to cumulate the results of a particular column. One usage is to aggregate the sales column of several orders. Assuming, for example, that column B in output table 100 of FIG. 1, uses the ADD aggregation operator, input values for column B, would add to existing values of column B in output table 100. If the row is an insert row, the insert row is inserted and no ADD operation for this new value of column B takes place. If the input row is an update row, the input value is added to the existing column value in output table 100. The result of applying input rows (2,2) and (2,4) then should be (2,6), but with the optimized UPSERT operation, row (2,2) would have been rejected as a duplicate, and the result would be (2,4), which is incorrect.

Also, the optimized UPSERT operation may not process input duplicates correctly when complex expressions and/or conditions are to be processed. For instance, in some cases, inserts/updates may need to be performed when certain conditions are met, otherwise, the input row may be rejected. For example, a condition for an optimized UPSERT operation may be: "UPSERT those rows where the sum of the existing value of B and the input value of B does not exceed 5". If the input row is an insert row, this condition is not applicable because an existing value for B does not exist, and the input row would be inserted into a table. If input row (2,4) of table 120 had been identified as an update row (e.g., as was the case for the non-optimized UPSERT operation) and input row (2,2) had been inserted into output table 100, then the sum of the input value of 4 and the value of column B of 2 would have been 6, and input row (2,4) would have been rejected, based on this condition. However, since input row (2,4) is identified as an insert row by the optimized UPSERT operation, this condition would not apply and input row (2,4) would not be rejected, which is again an incorrect choice.

There may be other errors possible with the optimized UPSERT operation when there are complex expressions used, involving the use of existing column data values and input values. In some cases, the column values themselves may be computed incorrectly. For example, for an expression such as "value for column B is the average of the existing value and the input row value," mis-classification of a row as an input row could result in the wrong value being calculated for column B (e.g., the erroneous result row of(2,2) for the input row (2,4), instead of the correct row (2,3) (for an insert (2,2) and an update of (2,4)).

In addition, a SQL MERGE operation has been proposed and includes a WHEN MATCHED clause to differentiate the action on insert or update rows. The mis-categorization of a row, by a set based processing similar to the optimized UPSERT operation, would cause a wrong treatment of the input row. For more information on SQL MERGE, see, for example, Oracle 9i SQL Reference, Release 2 (9.2), Part Number A96540-02.

As a partial solution for the problem of discarded input duplicates, users may decide to manually reprocess the discard file of input duplicates through the non-optimized (row-by-row) UPSERT operation. Unfortunately, this reprocessing approach may not yield consistent results in all situations, especially when complex expressions and conditional evaluations are involved. Under those circumstances, users either need to deal with the inconsistency, or choose to use slower row-by-row non-optimized UPSERT operations.

Thus, although the optimized UPSERT operation is useful, there is a need in the art for improved processing of input duplicates.

SUMMARY OF THE INVENTION

Provided are a method, system, and article of manufacture for processing input data. Multiple input rows to be loaded into a first structure are received. Each input row of the multiple input rows is processed to classify each input row as one of an insert row and an update row, wherein input duplicates are stored in the first structure and index entries for the input duplicates are stored in a second structure. After the multiple input rows have been processed, the input duplicates are automatically re-applied to the first structure and the index entries stored in the second structure are processed.

Also provided are a method, system, and article of manufacture for processing input data in which one or more input rows are loaded into an output table, and wherein index entries for input rows are stored in a first structure and discarded input rows are stored in a third structure. Periodically, the loading of the one or more input rows is interrupted to perform an index merge, wherein input duplicates for which corresponding index entries in the first structure are not added to an index are stored in a second structure. It is determined whether to add data for one or more discarded input rows in the third structure to the second structure. When it is determined that data for one or more discarded input rows in the third structure are to be added to the second structure, data for the discarded input rows are added to the second structure. Input duplicates and discarded input rows for which data is stored in the second structure are automatically reapplied to the output table.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
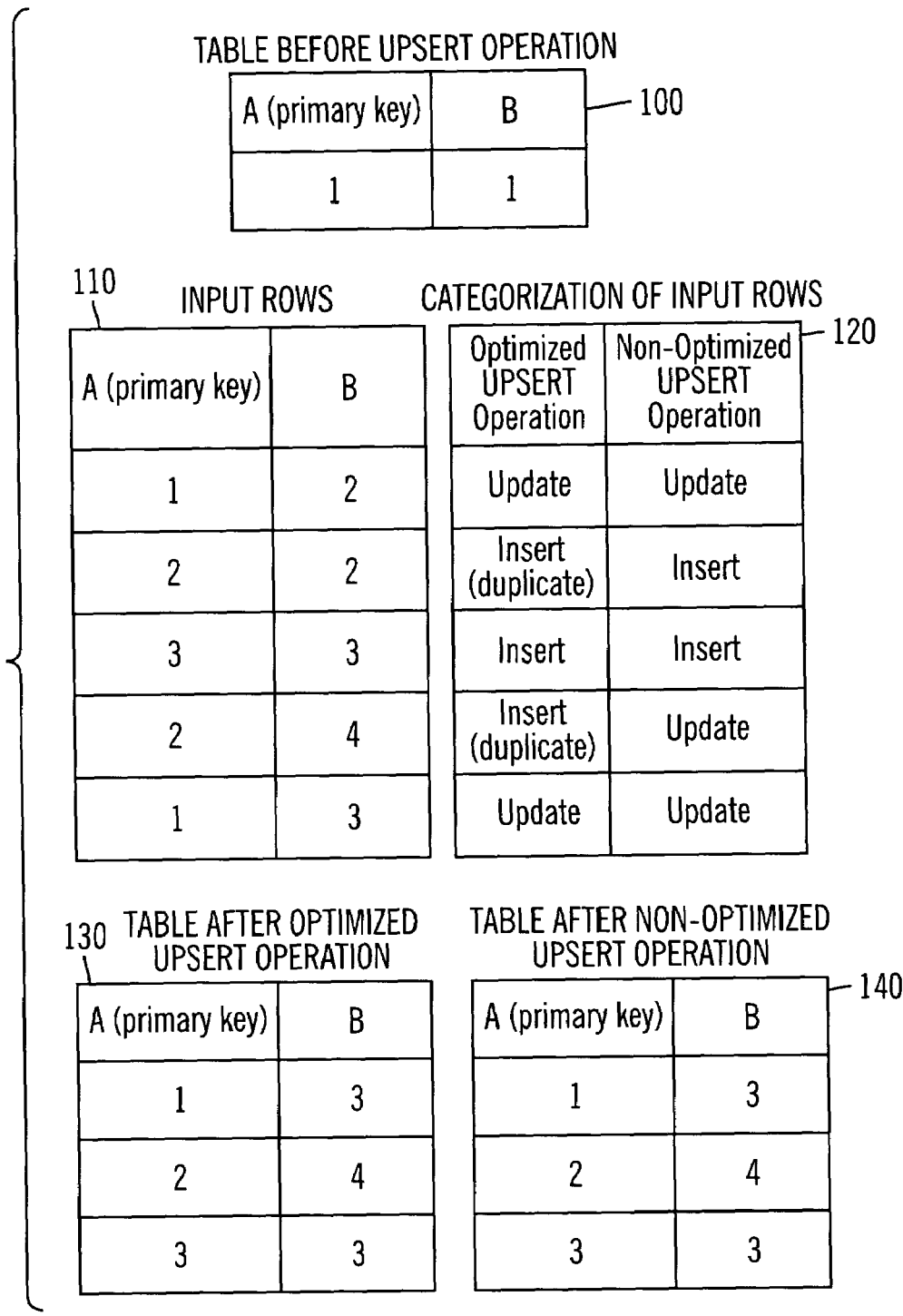
FIG. 1 illustrates tables used in an example of an UPSERT operation.
Figure 2:
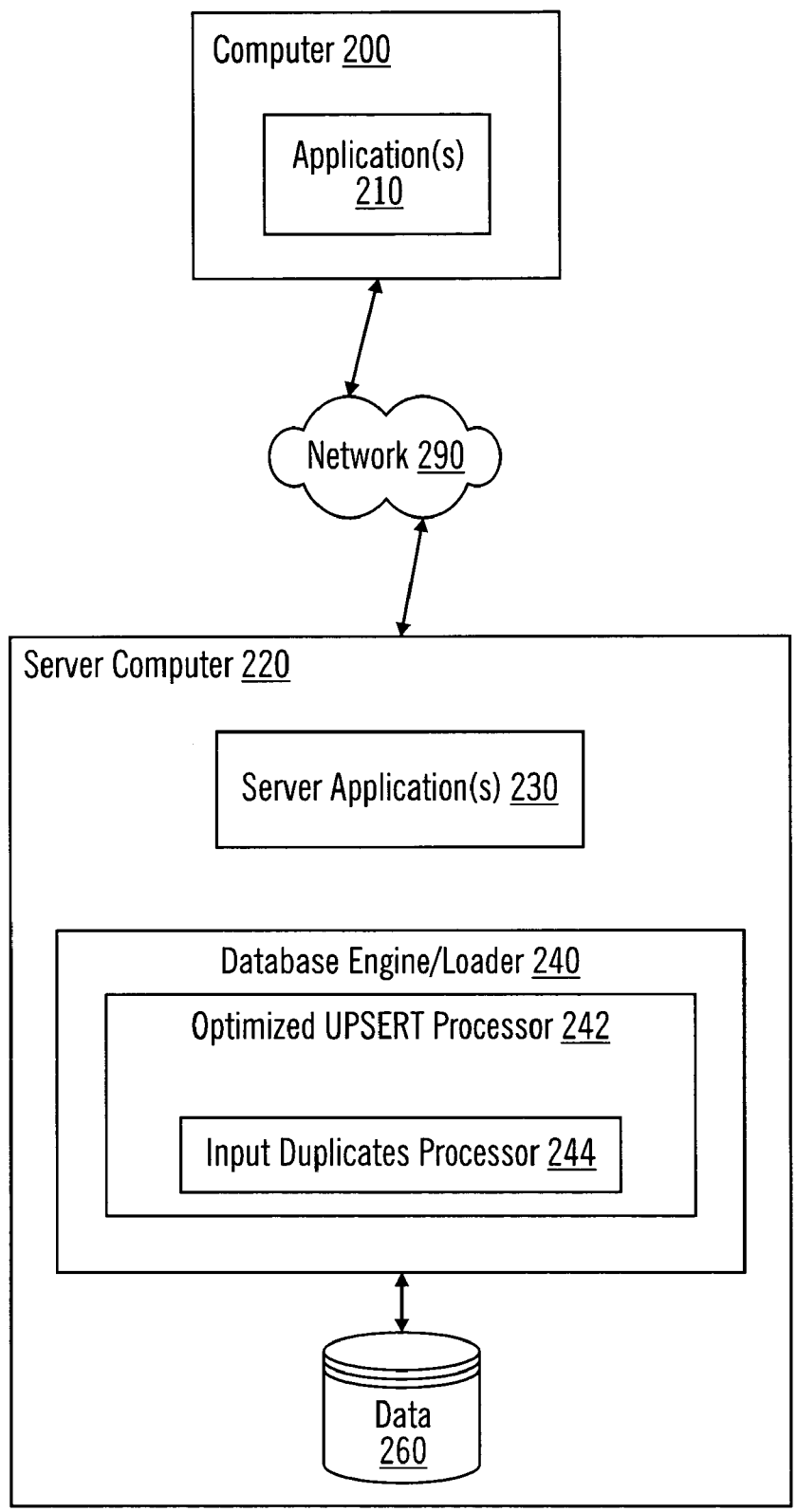
FIG. 2 illustrates, in a block diagram, a computing environment in accordance with certain implementations of the invention.

FIG. 2 illustrates, in a block diagram, a computing environment in accordance with certain implementations of the invention. A computer 200 executes one or more applications 210. An application 210 may be any type of application program. The computer 200 may be a client computer, a server computer, an operator console, or any other computer. The computer 200 is connected to a server computer 220 by a network 290, such as a local area network (LAN), wide area network (WAN), or the Internet. The Internet is a world-wide collection of connected computer networks (i.e., a network of networks).

The applications 210 may access data managed by the server computer 220 by issuing queries (e.g., SQL queries) to the server computer 220. The server computer 220 includes one or more server applications 230. A server application 230 may be any type of application program.

Moreover, the server computer 220 includes a database engine/loader 240. The database engine/loader 240 includes an optimized UPSERT processor 242, which includes a duplicates processor 244. The duplicates processor 244 processes updates to data inserted by insert operations. Data is stored in a database 160. Although the database engine/loader 240 is illustrated as one component, in certain implementations, the database engine and database loader may be separate components. Also, in certain implementations, the database loader may include an optimized UPSERT processor.

Implementations of the invention automatically reapply input duplicates to a table to enhance the optimized UPSERT operation to handle "updates to inserts" situations. Implementations of the invention are applicable to database loads as well as to other UPSERT-like situations, such as, for example, the SQL MERGE command or Extraction, Transformation, and Loading (ETL) programs. Implementations of the invention provide proper identification and treatment of input duplicates. The optimized UPSERT operation together with the duplicates processing techniques of the invention, provide consistent results for UPSERT operations and are useful in speeding up MERGE type operations, especially for high-volume data.

Also, implementations of the invention, modify the optimized UPSERT index building operation to cause the first input row to be kept (e.g., just as for the optimized index inserting for INSERT operations) and then moves all the rest of the rows to a "duplicate list." The rows in this duplicate list are automatically re-applied.

Figure 3:
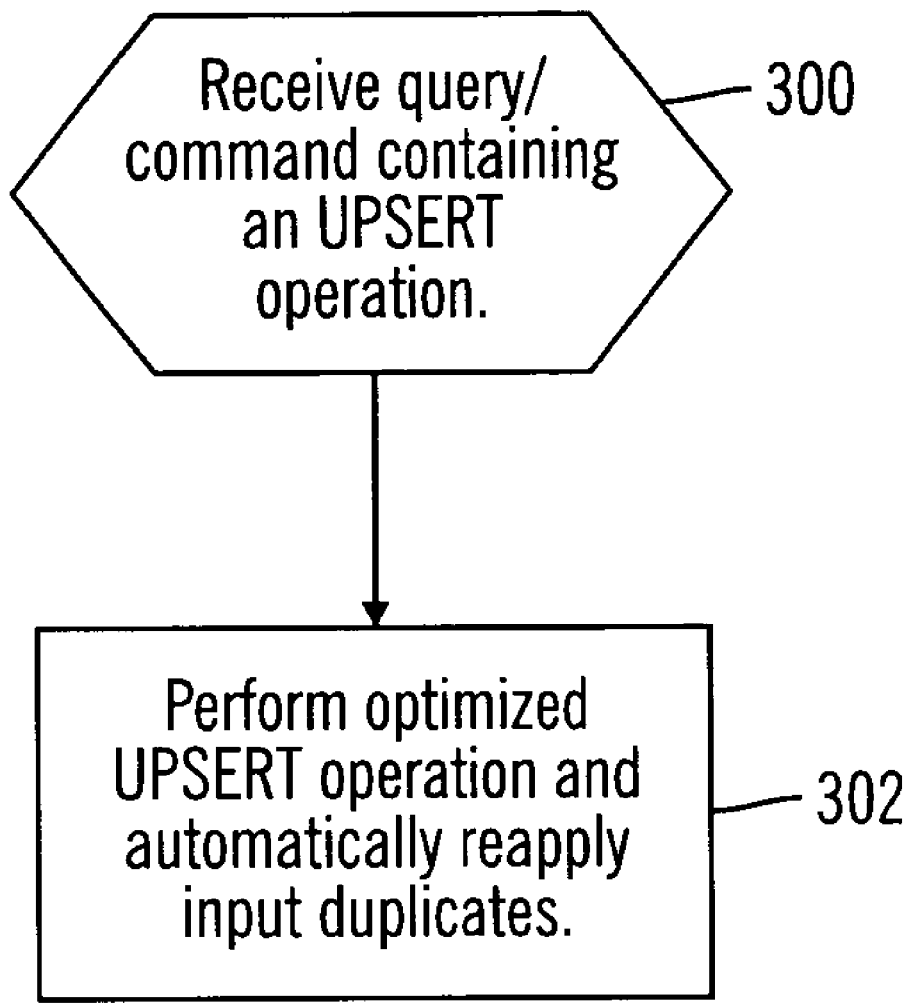
FIG. 3 illustrates logic implemented by the optimized UPSERT processor and the input duplicates processor in accordance with certain implementations of the invention.

FIG. 3 illustrates logic implemented by the optimized UPSERT processor 242 and the input duplicates processor 244 in accordance with certain implementations of the invention. Control begins at block 300 with receipt by the database engine/loader 240 of a query or load command containing an UPSERT operation. In block 302, the optimized UPSERT processor 242 performs an optimized UPS- ERT operation and stores input duplicates, and the input duplicates processor 244 automatically reapplies input duplicates.

If there were no expressions or aggregations etc. for an optimized UPSERT operation, mis-categorizing an "update to insert" row as an insert row may have no relevant impact and these "update to insert" rows may be silently rejected, without re-application, with the difference being that they are now not explicitly identified as duplications. However, when certain operators and complex expressions are used for an optimized UPSERT operation, the processing of input duplicates becomes potentially more complicated. These "update to insert" rows cannot simply be flagged and discarded as "duplicates," since, semantically, they are not duplicates and need to be re-processed.

Figure 4:
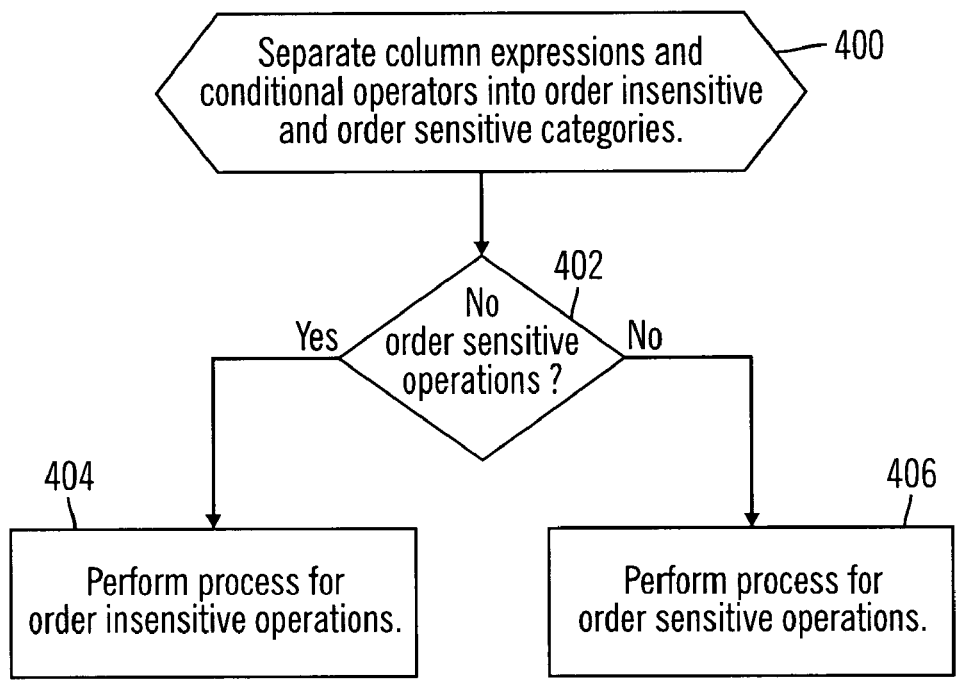
FIG. 4 illustrates logic for processing order sensitive and order insensitive operations in an UPSERT operation in accordance with certain implementations of the invention.

FIG. 4 illustrates logic for processing order sensitive and order insensitive operations in an UPSERT operation in accordance with certain implementations of the invention. After an UPSERT operation is received, column expressions and conditional operators are separated into order insensitive and order sensitive categories (block 400). In certain implementations, the decision to separate column expressions and conditional operators is made at startup of the optimized UPSERT (e.g., just after the optimized UPSERT operation is received, along with the list of operators and expressions used, and the input row format). The list of expressions and operators and references to existing column values are scanned to decide whether to use the order insensitive approach or do the order sensitive processing.

Order insensitive operations are ones for which the result of an operation is the same even if the input duplicates are processed in an order different than the input row order. The input duplicates processor 244 enforces that the first row identified as the input duplicate is the first row to be inserted into a table. The remaining input rows are then "applied" in any order (e.g., out of order). The order insensitive operations include, for example: a RETAIN operator; aggregation operators, such as, ADD, SUBTRACT, MIN, and MAX; and, conditional expressions with only input values (i.e. those that make no reference to existing data values). For more information on conditional expressions see the IBM® RedBrick® Table Management Utility (TMU) Reference Guide Version 6.2 available from International Business Machines Corporation.

Order sensitive operations are ones for which the input duplicates need to be applied in the input row order to get a consistent result. Order sensitive operations include, for example: most complex expressions; conditions with references to existing, columns; and, general WHEN MATCHED clauses in a SQL MERGE command.

In block 402, if the optimized UPSERT operation does not include order sensitive operations (e.g., includes only order insensitive operations or no operations), processing continues to block 404, otherwise, processing continues to block 406. In block 404, processing for order insensitive operations is performed. In block 406, processing for order sensitive operations is performed.

Figure 5A:
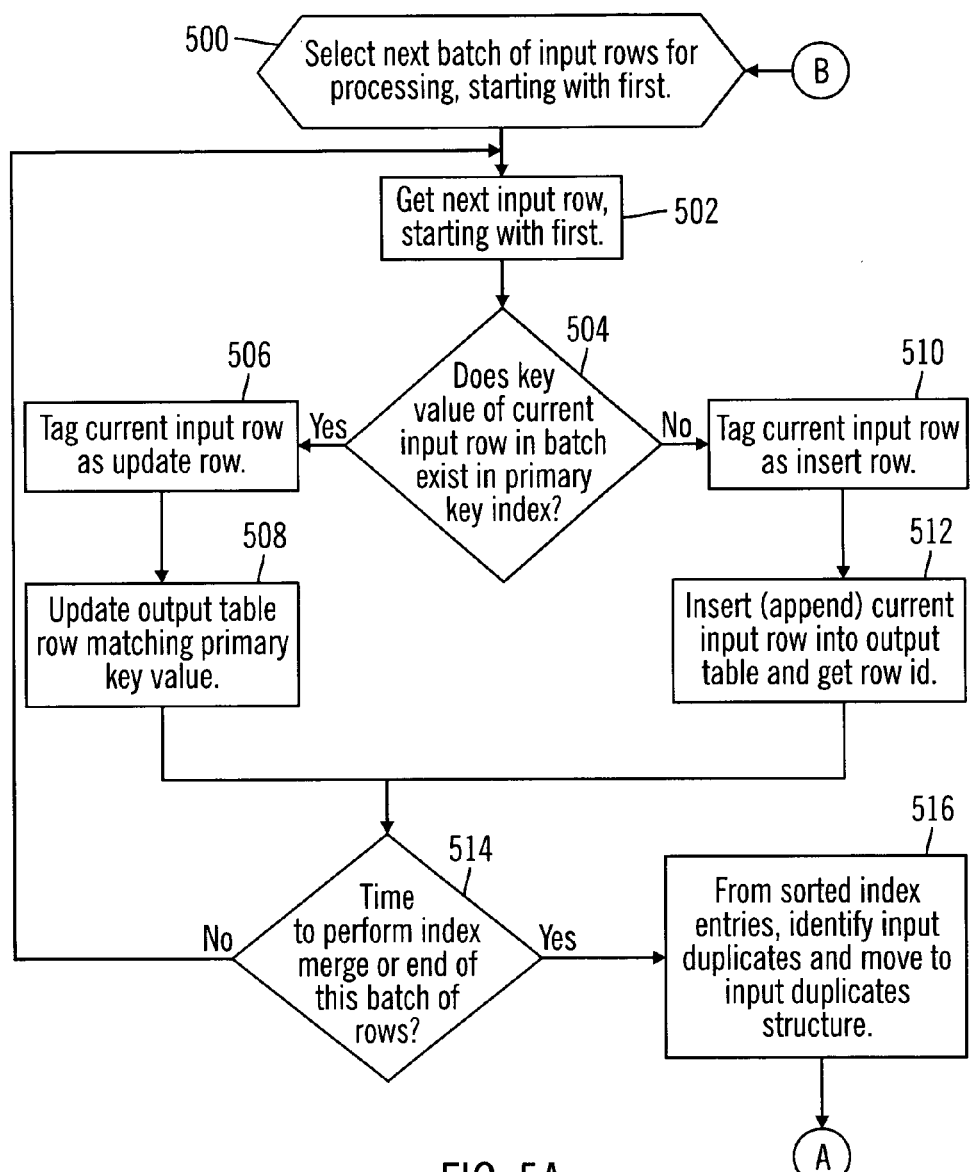
FIGS. 5A and 5B illustrate further logic for processing order insensitive operations in an UPSERT operation in accordance with certain implementations of the invention.
Figure 5B:
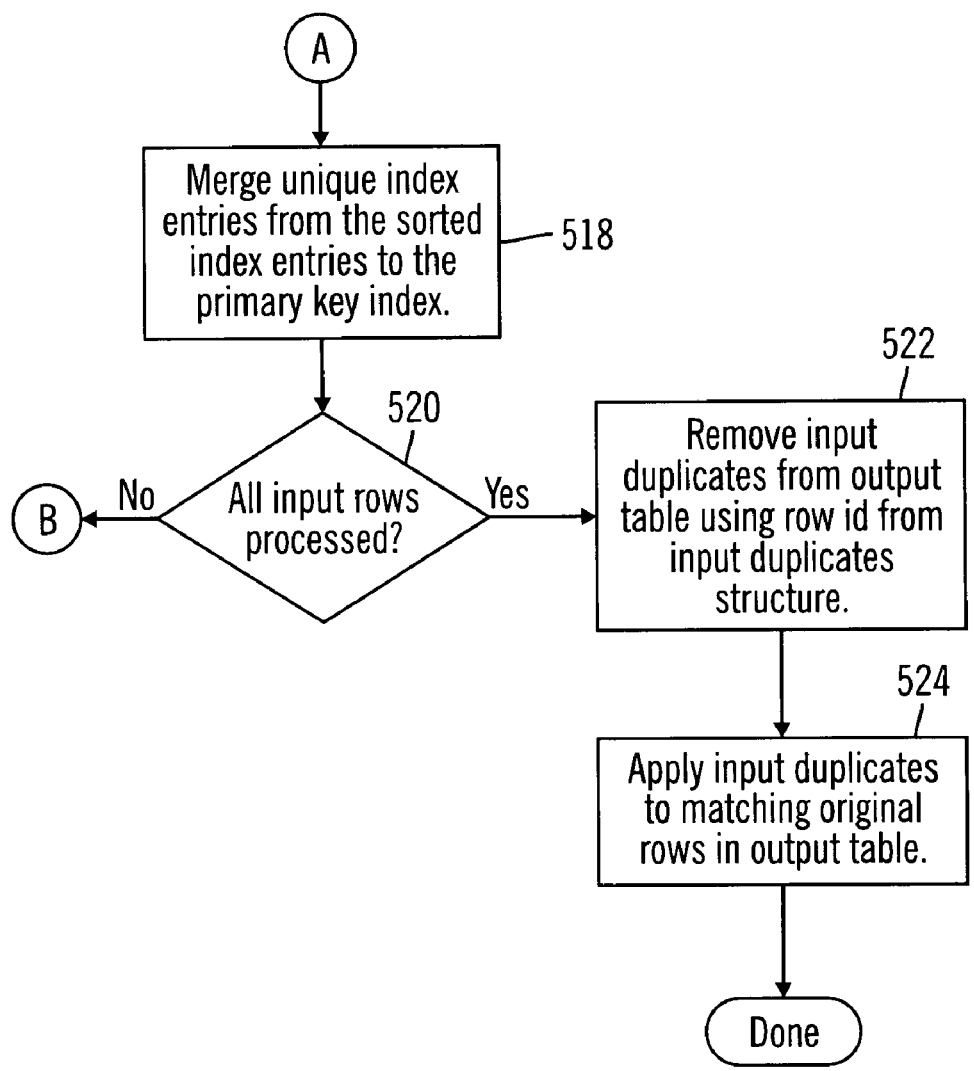

FIGS. 5A and 5B illustrate further logic for processing order insensitive operations in an UPSERT operation in accordance with certain implementations of the invention. Control begins at block 500 with selection of a next batch of input rows for processing by the optimized UPSERT processor 242. In block 502, the optimized UPSERT processor 242 gets the next row, starting with the first in the batch. This input row is the "current input row." In block 504, the optimized UPSERT processor 242 determines whether the key value of the current input row exists in the primary key index. If so, processing continues to block 506, otherwise, processing continues to block 510.

In block 506, the optimized UPSERT processor 242 tags the current input row as an update row. In block 508, the optimized UPSERT processor 242 updates the output table row matching the primary key value with the data in the current input row. In block 5160, the optimized UPSERT processor 242 tags the current input row as an insert row. In block 510, the optimized UPSERT processor 242 inserts (i.e., appends) the current input row in the output table and gets a row id.

In block 514, the optimized UPSERT processor 242 determines whether it is time to perform an index merge or if this is the end of this batch of rows. If so, processing continues to block 516, otherwise, processing loops back to block 502 to get the next input row in this batch. In block 516, the input duplicates processor 244 identifies input duplicates from the sorted index entries and moves the input duplicates to an input duplicates structure first sorted on its primary key, and then on its sequence number. The input row with the lowest sequence number (i.e., the earliest processed input row) is an "original" input row, and the rest of the input rows having the same primary key value as the original input row are termed "input duplicates." The sorted index entries may be stored in a sorted index entries structure (e.g., a list).

In block 518, the optimized UPSERT processor 242 merges unique index entries from the sorted index entries to the primary key index. In block 520, the optimized UPSERT processor 242 determines whether all input rows have been processed. If so, processing continues to block 522, otherwise, processing loops back to block 500 to process the next batch of input rows. In block 522, the optimized UPSERT processor 242 removes input duplicates from the output table using the row id from the input duplicates structure. In block 524, the input duplicates processor 244 applies input duplicates to the matching (i.e., corresponding) original rows in the output table. Additionally, events (such as to perform aggregations, other index operations, etc.) may be sent to other components.

For example, for order insensitive operations, for a large set of input rows, the optimized UPSERT operation may have several intermediate index merges, depending on the batch sizes chosen for batch processing of index entries. For the optimized UPSERT operation, input duplicates that were discovered during the index merges are stored in, for example, a "sort merge" location (e.g., a separate table or memory area). In certain implementations of the invention, a saved input duplicate entry includes, for example, a sequence number corresponding to its sequence in the input rows, a primary key value, and a reference to the corresponding inserted complete data row in the output table, called the "row id". By using the sequence number, the input duplicates processor 244 is able to ensure that the first input duplicate is retained in the table (i.e., as the original row).

At the end of all batch cycles and index merges, the input duplicates are re-applied. In certain implementations of the invention, the input duplicates processor 244 fetches the complete row data from the output table based on the row ids of the input duplicates. The input duplicates processor 244 removes the rows from the output table and applies each row data to update an earlier inserted row, one by one. Evaluations for expressions, conditions, and aggregations are performed in this reapply process.

Before an index merge has occurred, the rows identified as input duplicates are in, for example, a "sort merge" location (e.g., a memory area), and they have not been applied at this point. After one or more index merges have occurred, any input duplicate with the same primary key as a row in the output table is no longer designated as an insert row, and, instead, the input row is designated as an update row. Then, an update row may directly update a row in the output table. In certain implementations of the invention, input duplicates may not be applied in the order that they appear as input rows. Therefore, this technique is used for cases with order insensitive operations.

Figure 6A:
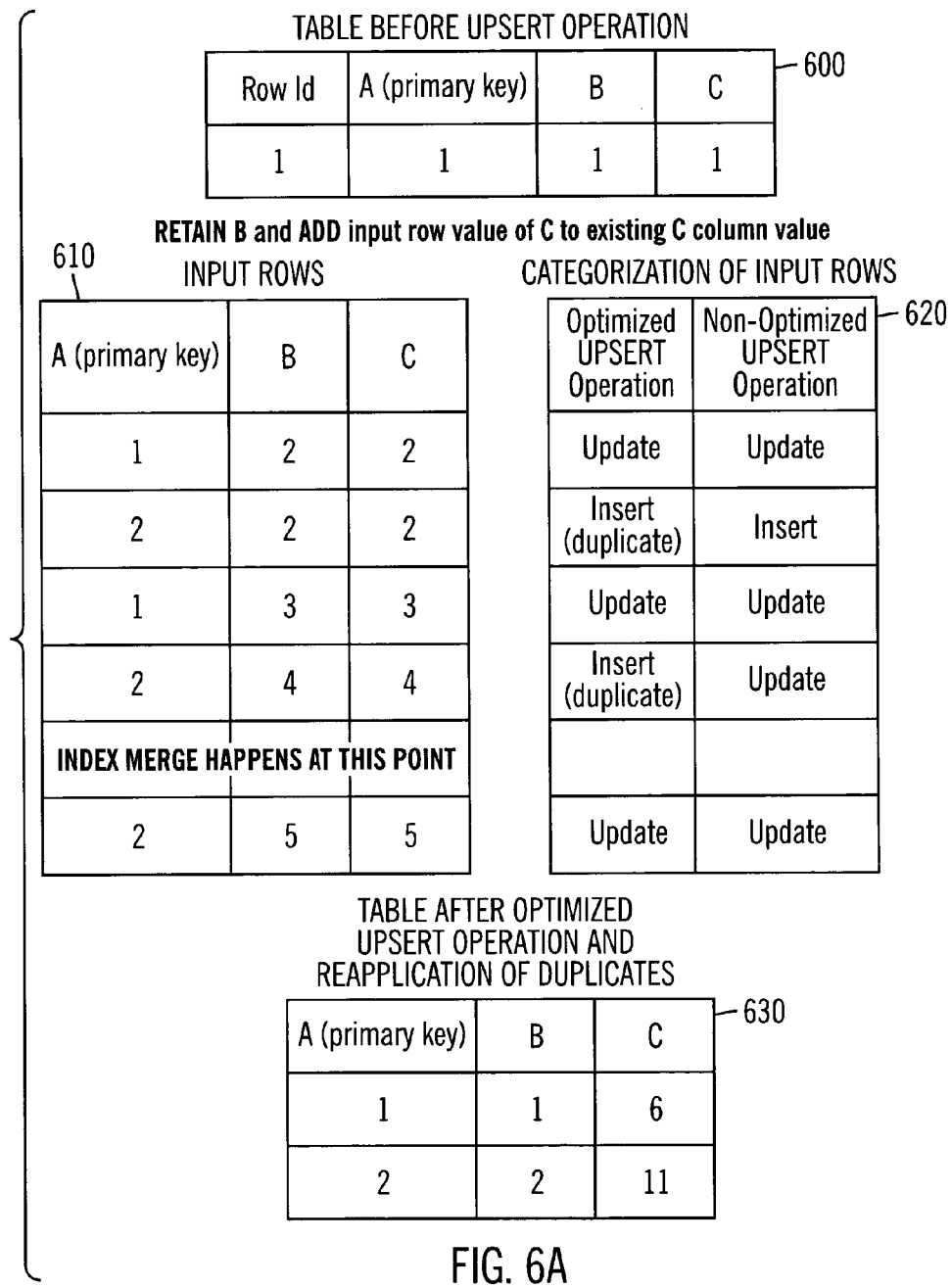
FIGS. 6A-6E illustrate an example of an optimized UPSERT operation followed by the re-application of input duplicates, with order insensitive operations, in accordance with certain implementations of the invention.

FIGS. 6A-6E illustrate an example of an optimized UPSERT operation followed by the re-application of input duplicates, with order insensitive operations, in accordance with certain implementations of the invention. In FIG. 6A, output table 600 represents the status of the output table before an UPSERT operation has been performed. Output table 600 has four columns: row id, A, B, and C. The row id is the physical reference to the row in the output table 600. Column A represents the primary key, and columns B and C hold other data. For this example, the following order insensitive operations apply: RETAIN B and ADD input row value of C to existing C column value.

Input table 610 lists input rows, and table 620 lists how the optimized UPSERT operation and the non-optimized UPSERT operation would characterize each input row. Also, after the first four rows of the input table 610 are applied to output table 600, an index merge is performed. Output table 630 represents the status of the output table after an optimized UPSERT operation has been performed.

Figure 6B:
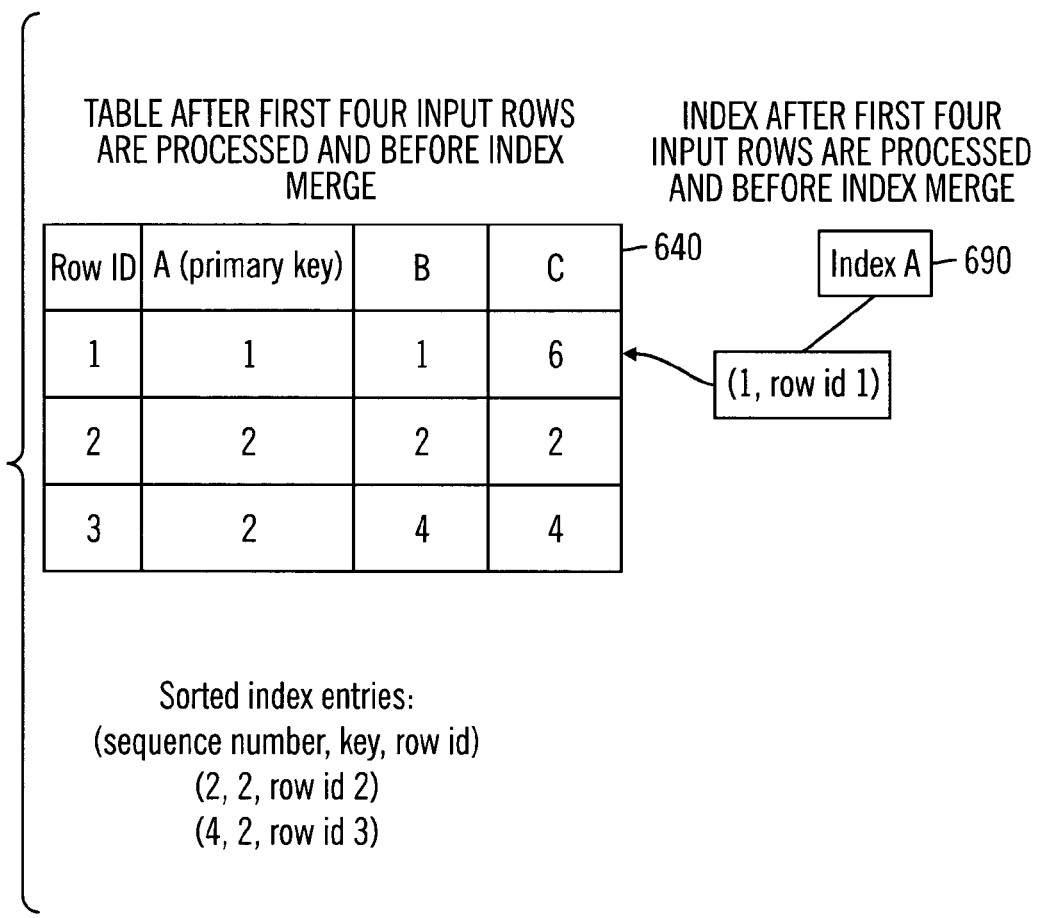

In FIG. 6B, output table 640 represents the status of the output table after the first four input rows are processed and before an index merge has occurred. Initially, since table 600 included a row (row id 1, 1, 1, 1) with primary key 1, that input row with row id 1 has been updated by the first and third input rows of input table 610. Therefore, the output table 640 includes a row (row id 1, 1, 1, 6). Since there is a RETAIN operator on column B, the value of column B has not been changed by the updates. Also, since there is an aggregation operator of ADD on column C, the values of C from the first and third input rows were added to the existing value of C (i.e., 2+3+1=6). Prior to the start of optimized UPSERT operation processing, an index entry (1, row id 1) corresponding to row (1, 1, 1) in output table 600 would already exist in index A 690. Therefore, index A 690 has an index entry for row (row id 1, 1, 1, 6). In certain implementations, index A 690 is a primary key index.

In certain implementations, the optimized UPSERT operation processing does not create the index entries in index A 690, but, by inspecting the index entries, it can be determined that a row corresponding to a primary key value (e.g., A=1) already exists. Then, any new input row that also has the same primary key value (e.g., A=1) is tagged an "update" row. For an input row, which does not have a corresponding entry in index A 690 (e.g., A=2), the row is tagged as an "insert" row.

At this stage, the second input row (2, 2, 2) and fourth input row (2, 4, 2) have been inserted into output table 640, and index entry building for these rows is postponed so that batch index entry building may be performed later. Index entries for the second input row (2, 2, 2) and fourth input row (2, 4, 2) are also added to, for example, a "sort merge" location (e.g., a memory area) of sorted index entries. The sorted index entries include a sequence number indicating a sequence in the input table 610, a primary key, and a row id. For the second input row (2,2,2), which is added to the output table 640 as row (row id 2, 2, 2, 2), the sorted index entry is (2, 2, row id 2). For the fourth input row (2, 4, 4), which is added to the output table 640 as row (row id 3, 2, 4, 4), the sorted index entry is (4, 2, row id 3). The index entries in the sorted index entries (i.e., those in the "sort merge" storage location) are sorted by the pair (primary key, sequence number). That is, they are sorted by primary key value first, and then by sequence number (i.e., input row (2,2) would appear before (2,4)).

Figure 6C:
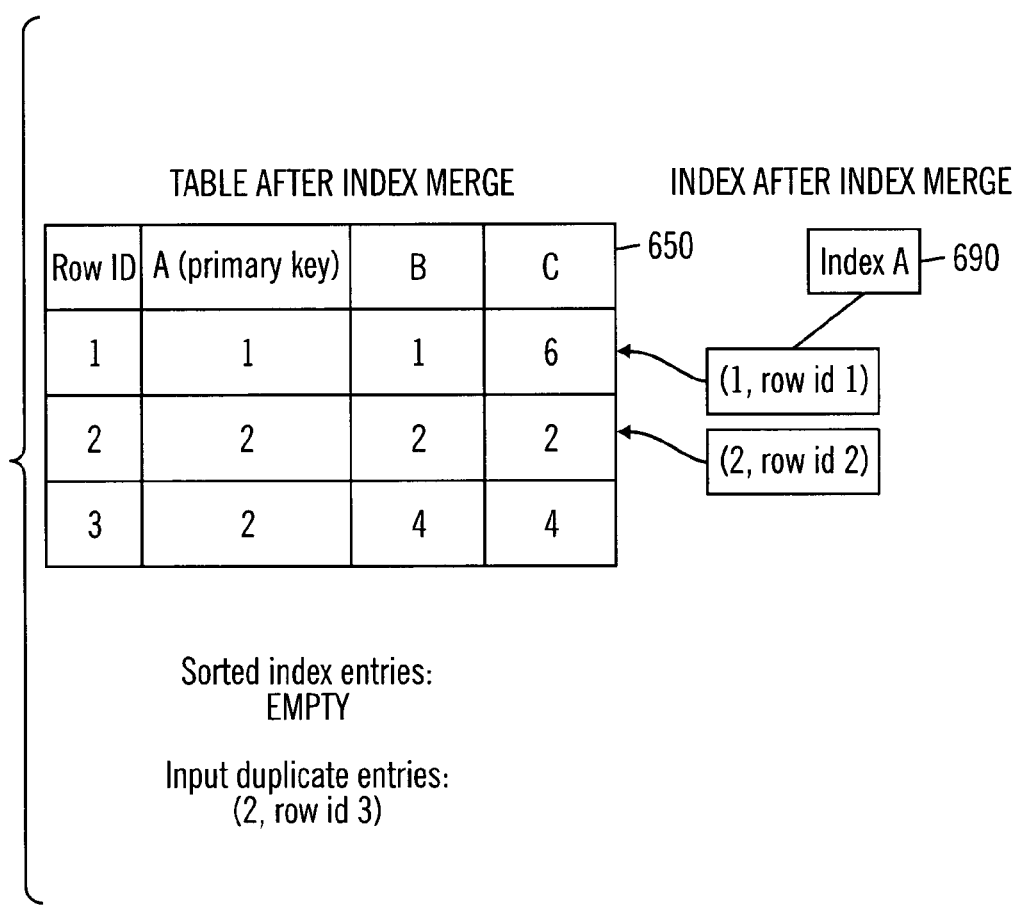

In FIG. 6C, output table 650 represents the status of the output table after the an index merge has occurred. For the index merge, the sorted index entries include (2, 2, row id 2) and (4, 2, row id 3). An index entry of (2, row id 2) is built in index A 690 for row (row id 2, 2, 2, 2) in output table 650. Row (row id 3, 2, 4, 4) remains in output table 650, its index entry is removed from the sorted index entries, and the input duplicate of (2, 4,4) is stored as a duplicate as (2, row id 3), which is in the format of (primary key, row id).

Figure 6D:
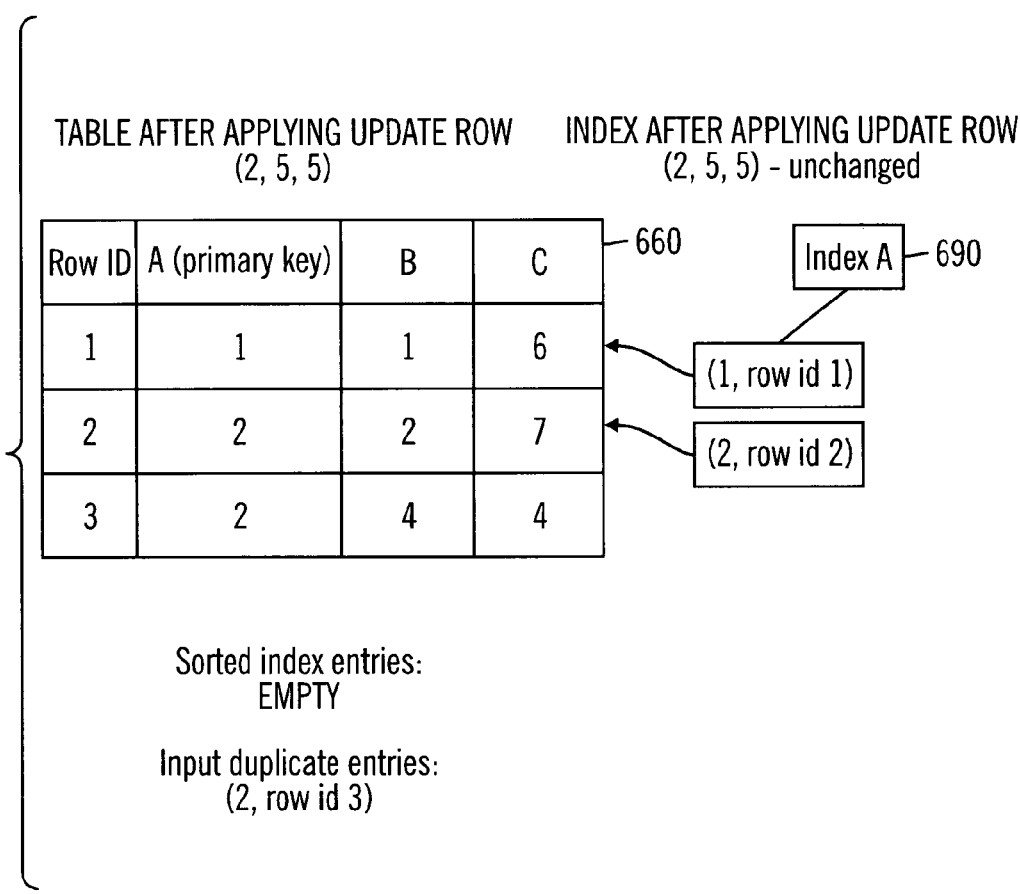

In FIG. 6D, output table 660 represents the status of the output table after the last input row (2, 5, 5) is applied. In particular, the input row (2, 5, 5) updates row (row id 2, 2, 2, 7), and index A 690 is unchanged.

Figure 6E:
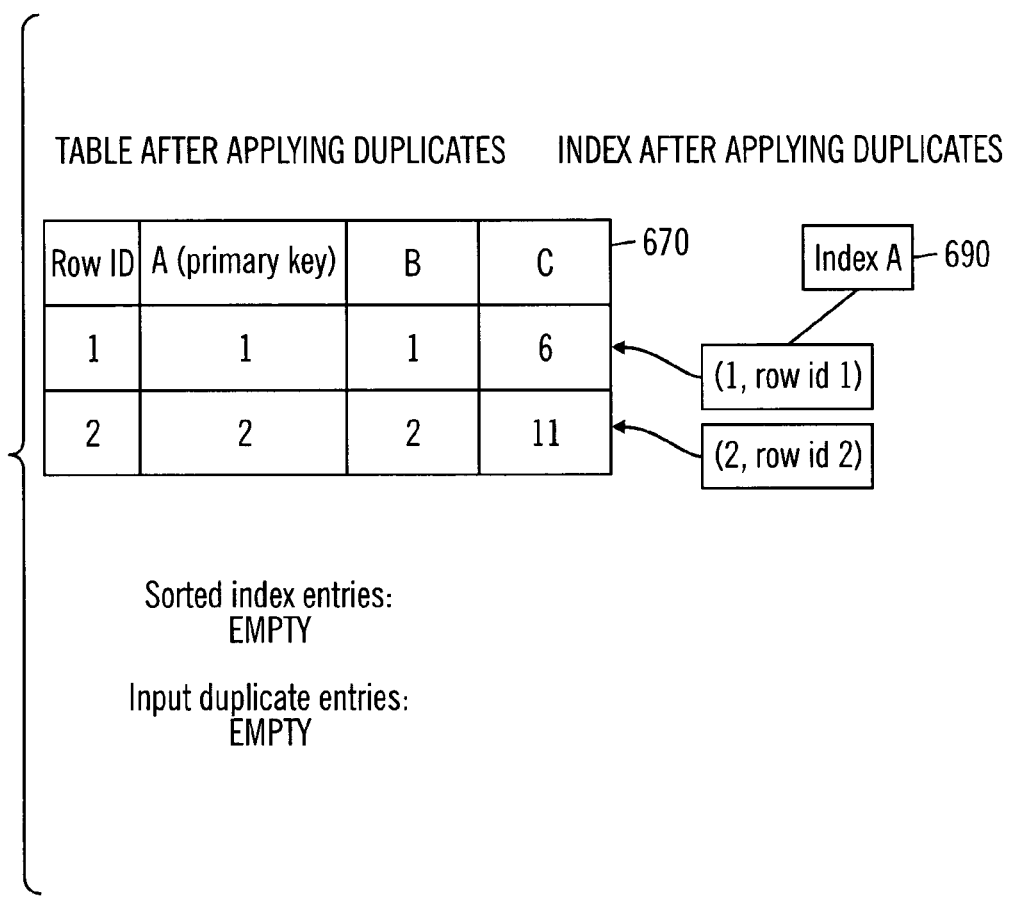

In FIG. 6E, since all input rows have been processed, the duplicate input row of (2, 4, 4) stored as a duplicate as (2, row id 3) is processed. The row (row id 3, 2, 4, 4) is removed from the output table 660 (FIG. 6D), and the row data of (2,4,4) is retrieved from the row. The primary key value of 2 is used to find the matching row id 2, and the row data of (2,2,7) is fetched. The row data of (2, 4, 4) is used to update row (row id 2, 2, 2, 7), and the order insensitive operations are applied when performing the update. That is, the operations of RETAIN B and ADD input row value of C to existing C column value are applied. Then, the row data of (2, 2, 11) is written back to the row with row id 2.

In certain implementations of the invention, for automatic aggregate tables defined on the output table, an aggregate maintenance component of the database engine/loader 240 maintain the aggregates (e.g., IBM® RedBrick® Warehouse product). The aggregate maintenance component has the ability to accept row change events. In this case, when applying the duplicate (2,4,4), the database engine/loader 240 would send events for row deletion of (2,4,4), row deletion of (2,2,7), and then row addition of (2,2,11)).

Figure 7A:
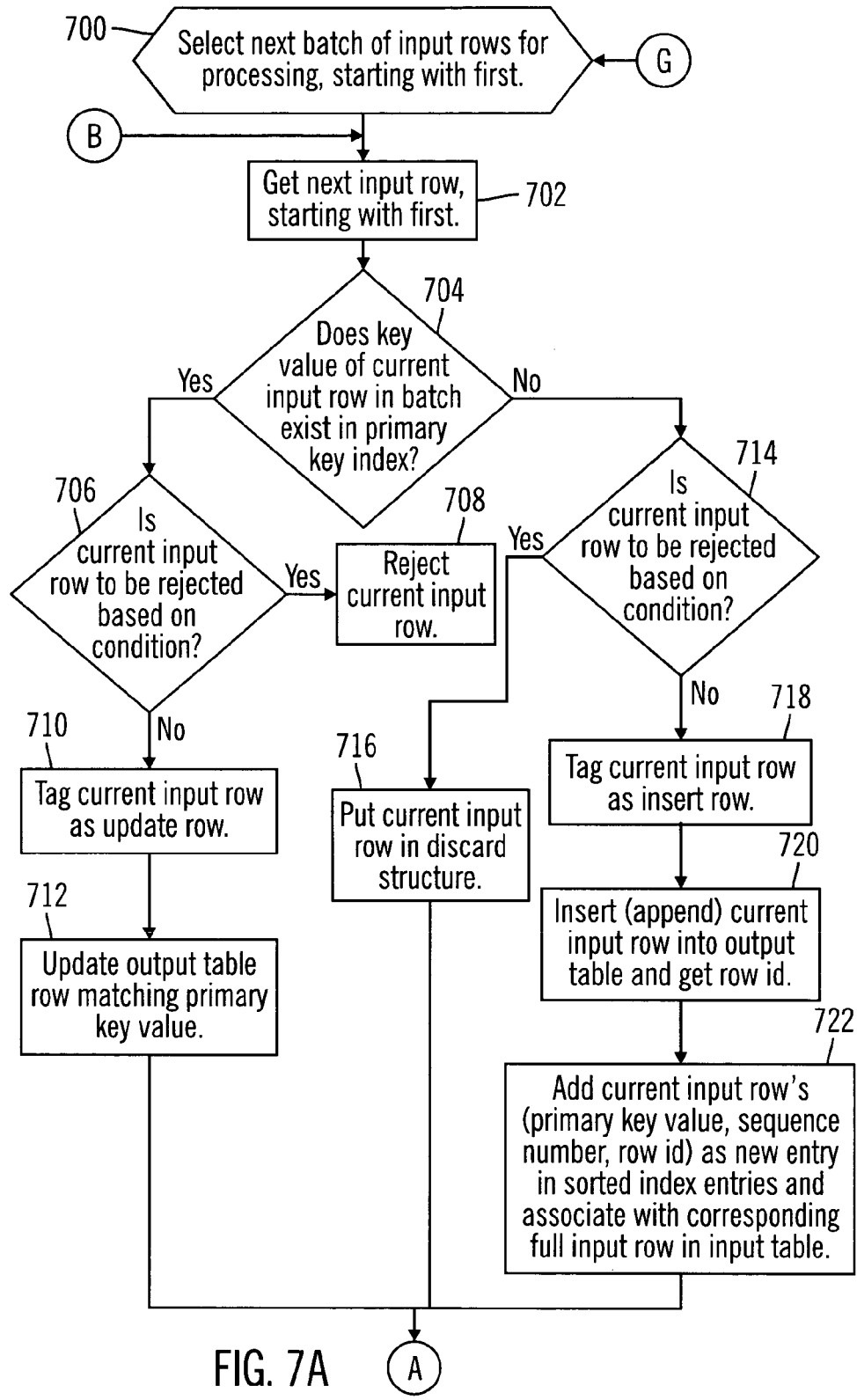
FIGS. 7A, 7B, 7C, and 7D illustrates further logic for processing order sensitive operations in an UPSERT operation in accordance with certain implementations of the invention.
Figure 7B:
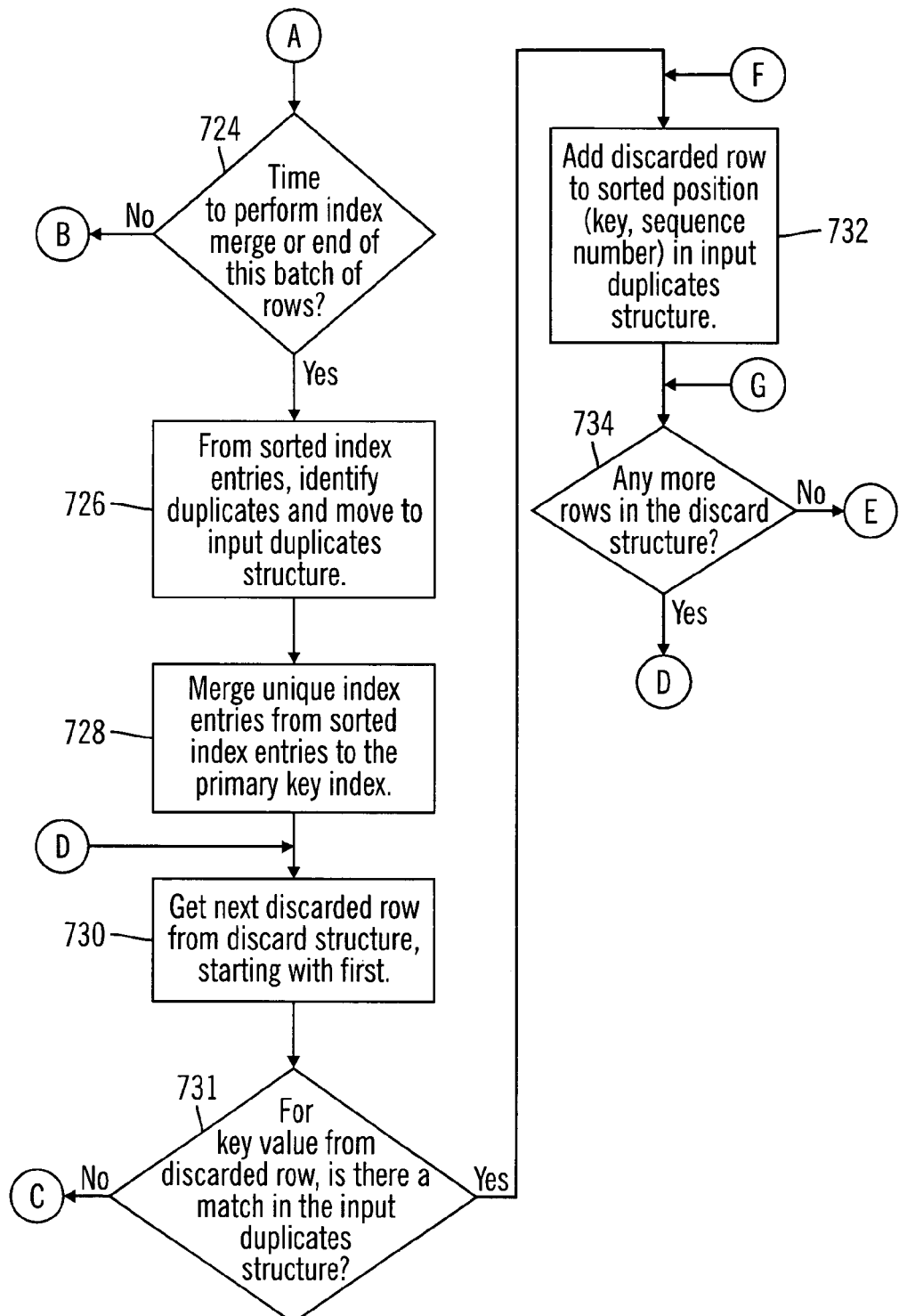
Figure 7C:
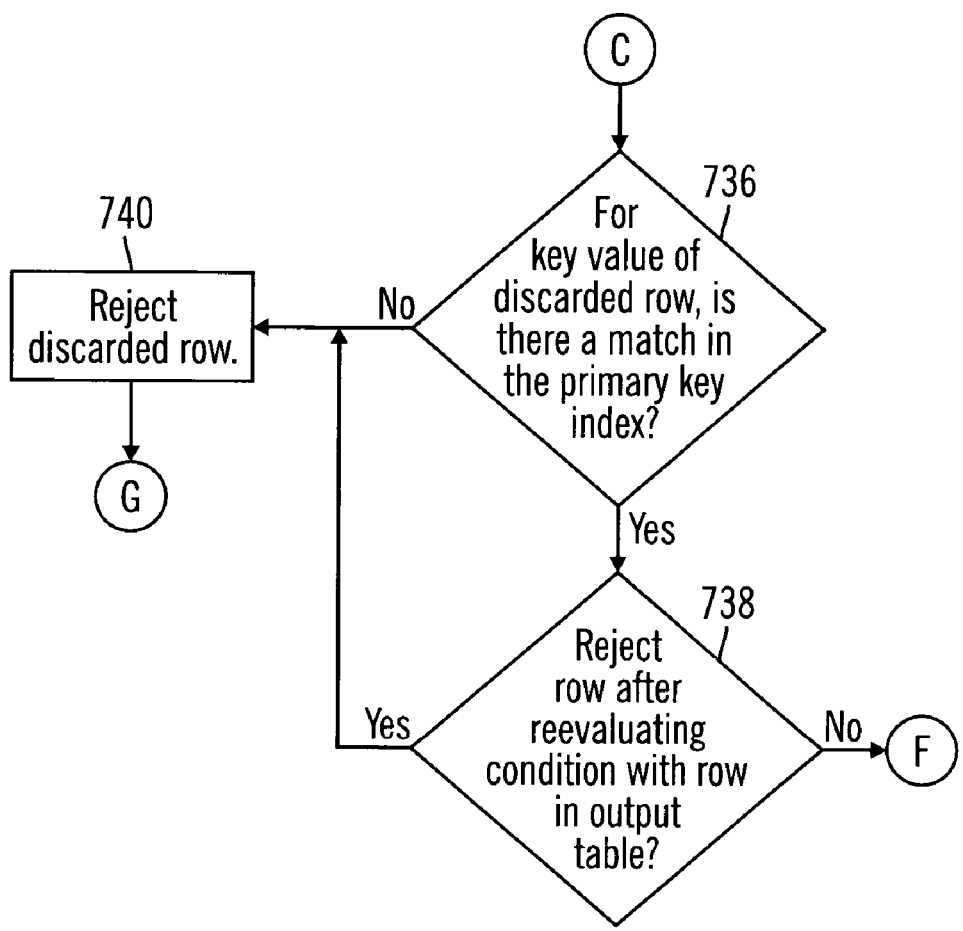
Figure 7D:
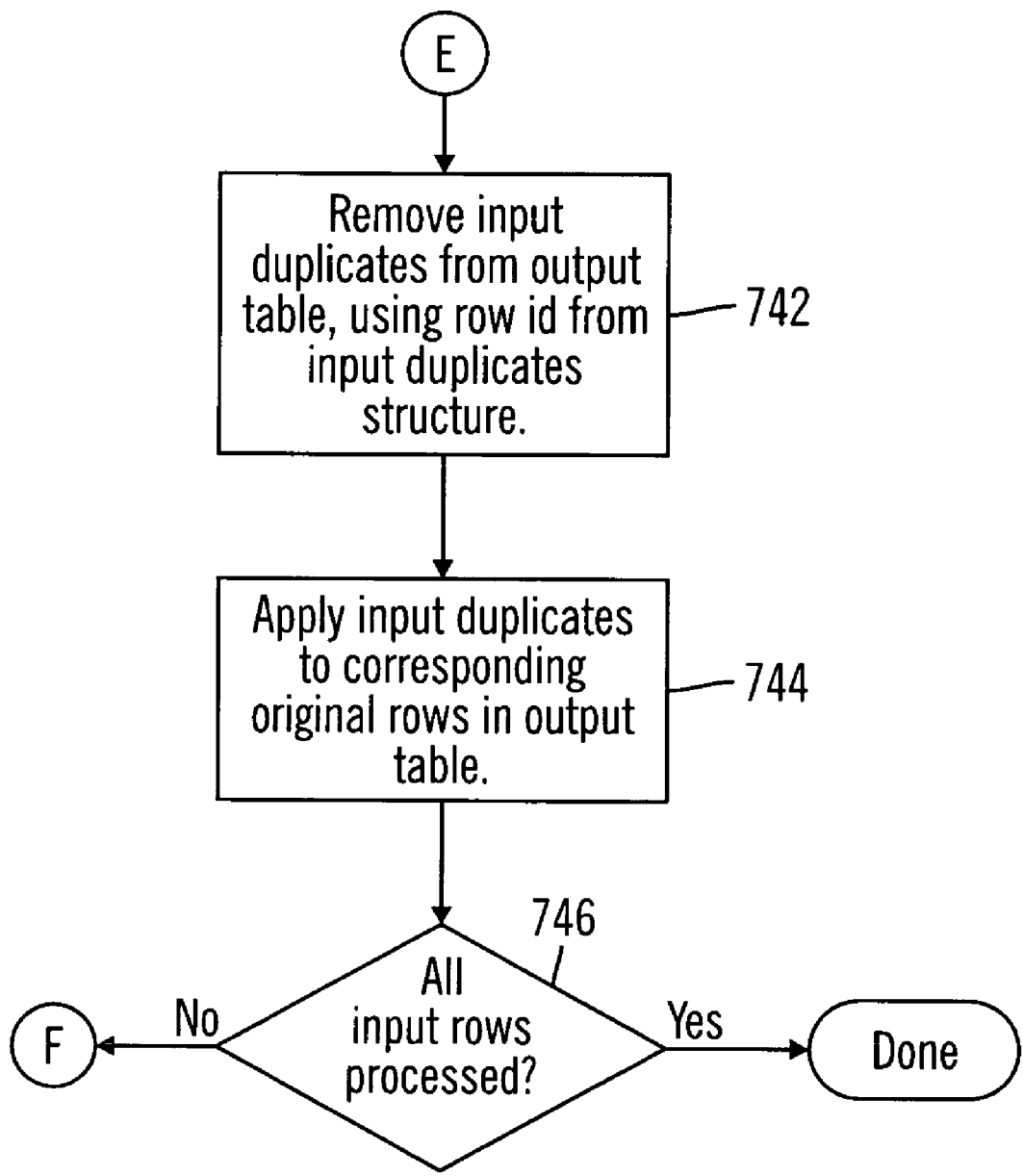

FIGS. 7A, 7B, and 7C illustrate further logic for processing order sensitive operations in an UPSERT operation in accordance with certain implementations of the invention. In particular, duplicate reapplying is performed after every index merge, instead of at the end of all the index merge batches. For example, with reference to FIGS. 6A-6E, the later input duplicate (2,5,5) would be applied after the input duplicate (2,4,4) had been applied.

In certain implementations, optimized UPSERT operations are likely to happen in parallel, and any synchronisms, such as an "index merge/duplicates apply" event message, may be costly in terms of performance. Therefore, in certain implementations, an order insensitive re-application approach at the very end (after all input rows have been processed and all index merges done) may be simpler and cheaper. However, for order sensitive expressions, implementations of the invention ensure that the index entries are consistent with the input rows seen in the batch so far, which means that the input duplicates need processing immediately after every index merge occurs, before the next batch of input rows are processed.

In FIG. 7A, control begins at block 700 with selection of a next batch of input rows for processing by the optimized UPSERT processor 242. In block 702, the optimized UPSERT processor 242 gets the next row, starting with the first in the batch. This input row is the "current input row." In block 704, the optimized UPSERT processor 242 determines whether the key value of the current input row exists in the primary key index. If so, processing continues to block 706, otherwise, processing continues to block 714.

In block 706, the optimized UPSERT processor 242 determines whether the current input row is to be rejected based on a condition (e.g., a conditional expression). If so, processing continues to block 708, otherwise, processing continues to block 710. In block 708, the current input row is rejected (i.e., this input row is to be truly discarded). In block 710, the optimized UPSERT processor 242 tags the current input row as an update row. In block 712, the optimized UPSERT processor 242 updates the output table row matching the primary key value with the data in the current input row.

In block 714, the optimized UPSERT processor 242 determines whether the current input row is to be rejected based on a condition (e.g., a conditional expression). If so, processing continues to block 716, otherwise, processing continues to block 718. In block 716, the optimized UPSERT processor 242 puts the current input row into a discard structure, and the rows in the discard structure may be referred to as "discarded rows." Note that the discarded rows are insert rows. An update row that is discarded would have been rejected (i.e., truly discarded rather than stored in a discard structure) because the update row did not satisfy the conditions for updating a row. In block 718, the optimized UPSERT processor 242 tags the current input row as an insert row. In block 720, the optimized UPSERT processor 242 inserts (i.e., appends) the current input row into the output table and gets a row id. In block 722, the input duplicates processor 244 adds the (primary key value, sequence number, row id) of the current input row as a new entry in the sorted index entries and associates this with the corresponding full input row in the input table.

In block 724, the optimized UPSERT processor 242 determines whether it is time to perform an index merge or if this is the end of this batch of rows. If so, processing continues to block 726, otherwise, processing loops back to block 702 to get the next input row in this batch. In block 726, the input duplicates processor 244 identifies input duplicates from the sorted index entries and moves the input duplicates to an input duplicates structure. Again, the input row with the lowest sequence number (i.e., the earliest processed input row) is an "original" input row, and the rest of the input rows having the same primary key value as the original input row are termed "input duplicates." In block 728, the optimized UPSERT processor 242 merges unique index entries from the sorted index entries to the primary key index.

In block 730, the input duplicates processor 244 gets the next discarded row from the discard structure, starting with the first. In block 731, the input duplicates processor 244 determines whether there is a match in the input duplicates structure for the key value from the discarded row. If so, processing continues to block 732, otherwise, processing continues to block 736. In block 732, the input duplicates processor 244 adds the discarded row to a sorted position (key, sequence number) in the sorted input duplicates structure.

That is, the input duplicates processor 244 probes the sorted input duplicates structure for a same primary key value and adds the row information to the sorted input duplicates structure if there is a primary key match. If there is no primary key match in the sorted input duplicates structure, the input duplicates processor 244 uses the primary key value of the discard row to probe the primary index of the output table. If there is a match in the primary index, the row data for the discard row is fetched and reevaluated against any relevant conditional expressions. If the one or more conditions are now satisfied, the row information is added into the sorted input duplicates structure. Otherwise, if the one or more conditions are not satisfied or there is no match in the primary key index, the discard row may be deleted or ignored. The primary key probe deals with a situation in which only the first row of a set of input duplicates is inserted into the output table and the rest of the input duplicates are discarded due to incorrect condition calculations. In this situation, the row may be reapplied to the matched table row directly if the discard process preserves the input ordering.

In block 734, the input duplicates processor 244 determines whether there are any more rows in the discard structure. If so, processing loops back to block 730, otherwise, processing continues at block 742.

In block 736, the input duplicates processor 244 determines whether there is a match in the primary key index for the key value of the discarded row. If so, processing continues to block 738, otherwise; processing continues to block 740. In block 738, the input duplicates processor 244 determines whether the discarded row is to be rejected (i.e., truly discarded) after reevaluating the condition with the row in the output table. If so, processing continues to block 740, otherwise, processing continues to block 742. In block 740, the discarded row is rejected.

In block 742, the input duplicates processor 224 removes input duplicates from the output table using the row id from the input duplicates structure. In block 744, the input duplicates processor 244 applies input duplicates to the matching original rows in the output table. Additionally, events (such as to perform aggregations, other index operations, etc.) may be sent to other components. At this point, the sorted input duplicates structure includes additional data (e.g., row id to retrieve data from the output table and/or column values (e.g., from the input table and/or the output table)). For each primary key, the input duplicates in the sorted input duplicates structure are sorted using their sequence number, so that the order reflects the input order. Then, the input duplicates processor 244 applies the input duplicates in the sorted input duplicates structure to the output table, one by one. Again, a row is discarded if the row does not satisfy any conditions, otherwise, the row is used to update a row in the output table by using any specified operators and expressions.

In block 746, the optimized UPSERT processor 242 determines whether all input rows have been processed. If so, processing is done, otherwise, processing loops back to block 700 to process the next batch of input rows.

For order sensitive operations, the input duplicates processor 244 saves more input data values in the duplicate list, rather than just the row id and primary key values. For example, assume that an UPSERT operation includes an expression, such as "set the column value B to be the sum of existing value for B and input data value D for update and just the input value of B for insert." If an input row is categorized as insert row, then the input row will insert just the input row value for B, however, the value of input value D would be lost, since input data value D may not be inserted into any table column. Then, since the value for D is unavailable, reapplication of input duplicated would not be possible. Therefore, the input duplicated processor 244 saves the value of input value D with an index entry in the sorted index entry structure (e.g., array) for this example. In certain implementations of the invention, an entire input row may be preserved.

The input duplicates processor 244 reapplies the discarded input rows that were incorrectly rejected based on conditions. For example, assume there is a condition, such as "for insert row only, column C should be larger than 5". With reference to FIGS. 6A-6E, when input duplicates (2,2, 7) and (2,4,4,) are encountered in that order, input duplicate (2,4,4) would be considered an insert for an optimized UPSERT operation, thus the condition is not satisfied, and the input row would be discarded (e.g., stored in a discard file). The data for the discarded input row would not be inserted into the output table. However, input duplicate (2,4,4) should be treated as an update row, rather than an insert row. Therefore, the input duplicates processor 244 assigns an input sequence number for every discard and saves such discarded input rows in, for example, a temporary area or table. These incorrectly discarded input duplicates are later discovered and reapplied, together with the input duplicates found after an index merge completes.

The optimized UPSERT operation is used to process the input rows until an index merge is required (e.g., when there is a full batch of index entries to be processed). At the end of each index merge, there is a list of duplicates and a table with discarded input rows.

In certain implementations of the invention, if the distribution of the input data is known, for example, for a SQL MERGE command, a user (e.g., system administrator) may make a judgment on the cost and pick either a row-by-row technique (i.e., non-optimized UPSERT) or the optimized UPSERT operation. For a database load, the distribution of the data is typically unknown, and the user is given the option to pick one technique over the other.

Thus, implementations of the invention automatically reapply input duplicates ("updates to inserts") for optimized UPSERT operations. Moreover, implementations of the invention process input duplicates for optimized UPSERT operations having order insensitive operators and/or order sensitive operators.

Additional Implementation Details

The described techniques for processing update and insert operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3, 4, 5A-5B, and 7A-7D describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3, 4, 5A-5B, and 7A-7D may be implemented in software, hardware, programmable and non-programmable gate array logic or in some combination of hardware, software, or gate array logic.

Furthermore, the illustrated logic of FIGS. 3, 4, 5A-5B, and 7A-7D was described as being performed by certain components of FIG. 2, but, the logic may be performed by different components or by any combination of components.

Figure 8:
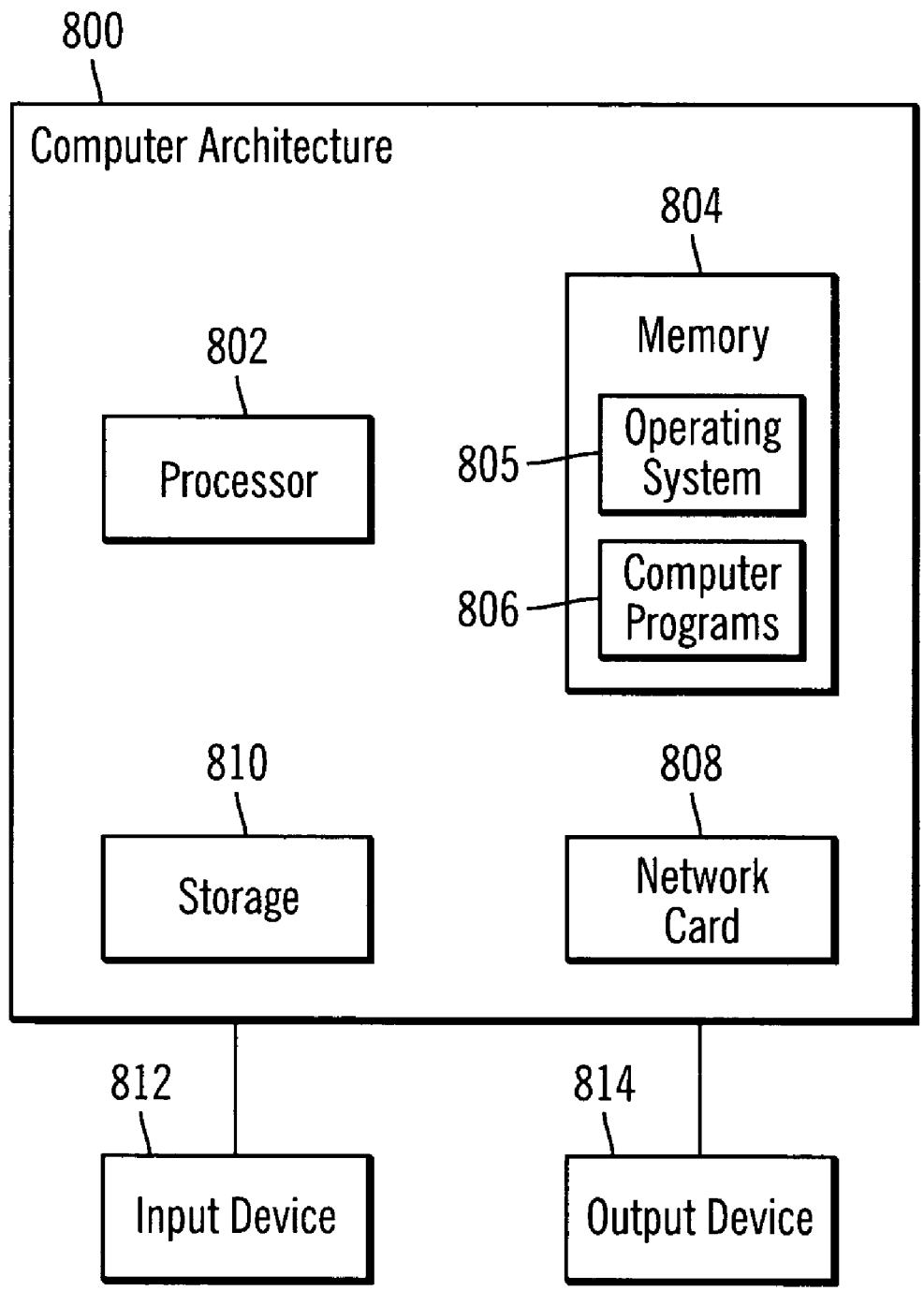
FIG. 8 illustrates an architecture of a computer system that may be used in accordance with certain implementations of the invention.

FIG. 8 illustrates an architecture of a computer system that may be used in accordance with certain implementations of the invention. For example, computer 200 and/or server computer 220 may implement computer architecture 800. The computer architecture 800 may implement a processor 802 (e.g., a microprocessor), a memory 804 (e.g., a volatile memory device), and storage 810 (e.g., a non-volatile storage area, such as magnetic disk drives, optical disk drives, a tape drive, etc.). An operating system 805 may execute in memory 804. The storage 810 may comprise an internal storage device or an attached or network accessible storage. Computer programs 806 may be loaded from storage 810 into the memory 804 and executed by the processor 802 in a manner known in the art. The architecture further includes a network card 808 to enable communication with a network. An input device 812 is used to provide user input to the processor 802, and may include a keyboard, mouse, pen-stylus, microphone, touch sensitive display screen, or any other activation or input mechanism known in the art. An output device 814 is capable of rendering information from the processor 802, or other component, such as a display monitor, printer, storage, etc. The computer architecture 800 of the computer systems may include fewer components than illustrated, additional components not illustrated herein, or some combination of the components illustrated and additional components.

The computer architecture 800 may comprise any computing device known in the art, such as a mainframe, server, personal computer, workstation, laptop, handheld computer, telephony device, network appliance, virtualization device, storage controller, etc. Any processor 802 and operating system 805 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for processing input data comprising:
receiving multiple input rows to be loaded into a first structure, wherein the first structure is an output table;
processing each input row of the multiple input rows to classify each input row as one of an insert row and an update row, wherein input duplicates are appended to the first structure and index entries for the input duplicates are stored in a second structure, wherein an insert row is a row to be added to the first structure and an update row is an update to an existing row in the first structure, wherein input duplicates are duplicate input rows having a same primary key value, and wherein, of the input rows having the same primary key value, one is an original row; and
after the multiple input rows have been processed,
automatically re-applying the input duplicates to the first structure by removing the input duplicates from the first structure and applying the input duplicates to matching original rows in the first structure to update the matching original rows; and
merging index entries from the index entries stored in the second structure to a primary key index.

2. The method of claim 1, further comprising:
identifying duplicates in the index entries in the second structure; and
storing the identified duplicates in a third structure.

3. The method of claim 1, wherein the processing of the input data farther comprises order insensitive processing of input duplicates.

4. The method of claim 1, wherein the processing of the input data farther comprises order sensitive processing of input duplicates.

5. The method of claim 1, further comprising:
when an input duplicate is characterized as an update row, updating a corresponding row in the output table.

6. A method for processing input data, comprising:
loading one or more input rows into an output table, wherein input duplicates are appended to the output table, index entries for the input rows are stored in a first structure and discarded input rows are stored in a third structure, wherein the discarded input rows are input rows that are rejected based on a condition, wherein input duplicates are duplicate input rows having a same primary key value, and wherein, of the input rows having the same primary key value, one is an original row;
periodically interrupting the loading of the one or more input rows to perform an index merge, wherein input duplicates for which corresponding index entries in the first structure are not added to an index are stored in a second structure;
determining whether to add data for one or more discarded input rows in the third structure to the second structure;
when it is determined that the data for one or more discarded input rows in the third structure are to be added to the second structure, adding the data for the discarded input rows to the second structure; and
automatically reapplying input duplicates and discarded input rows for which data is stored in the second structure to the output table by removing the input duplicates from the output table and applying the input duplicates and the discarded input rows to matching original rows in the output table to update the matching original rows.

7. The method of claim 6, wherein determining whether to add the data for one or more discarded input rows in the third structure to the second structure further comprises:
searching for discarded input rows in the third structure with corresponding rows in the second structure and in the output table to identify potential input duplicates; and
applying conditions to the discarded input rows that are potential input duplicates.

8. The method of claim 6, wherein the processing of the input data further comprises at least one of order sensitive processing and order insensitive processing.

9. An article of manufacture comprising one of hardware logic implementing logic and a computer readable storage medium including a program for processing input data wherein the logic or program causes operations to be performed, the operations comprising:
receiving multiple input rows to be loaded into a first structure, wherein the first structure is an output table;
processing each input row of the multiple input rows to classify each input row as one of an insert row and an update row, wherein input duplicates are appended to the first structure and index entries for the input duplicates are stored in a second structure, wherein an insert row is a row to be added to the first structure and an update row is an update to an existing row in the first structure, wherein input duplicates are duplicate input rows having a same primary key value, and wherein, of the input rows having the same primary key value, one is an original row; and
after the multiple input rows have been processed,
automatically re-applying the input duplicates to the first structure by removing the input duplicates from the first structure and applying the input duplicates to matching original rows in the first structure to update the matching original rows; and
merging index entries from the index entries stored in the second structure to a primary key index.

10. The article of manufacture of claim 9, wherein the operations further comprise:
identifying duplicates in the index entries in the second structure; and
storing the identified duplicates in a third structure.

11. The article of manufacture of claim 9, wherein the operations for processing of the input data further comprise operations for order insensitive processing of input duplicates.

12. The article of manufacture of claim 9, wherein the operations for processing of the input data further comprise operations for order sensitive processing of input duplicates.

13. The article of manufacture of claim 9, wherein the operations further comprise:
when an input duplicate is characterized as an update row, updating a corresponding row in the output table.

14. An article of manufacture comprising one of hardware logic implementing logic and a computer readable storage medium including a program for processing input data, wherein the logic or program causes operations to be performed, the operations comprising:
loading one or more input rows into an output table, wherein input duplicates are appended to the output table, index entries for the input rows are stored in a first structure and discarded input rows are stored in a third structure, wherein the discarded input rows are input rows that are rejected based on a condition, wherein input duplicates are duplicate input rows having a same primary key value, and wherein, of the input rows having the same primary key value, one is an original row;

periodically interrupting the loading of the one or more input rows to perform an index merge, wherein input duplicates for which corresponding index entries in the first structure are not added to an index are stored in a second structure;

determining whether to add data for one or more discarded input rows in the third structure to the second structure;

when it is determined that the data for one or more discarded input rows in the third structure are to be added to the second structure, adding the data for the discarded input rows to the second structure; and automatically reapplying input duplicates and discarded input rows for which data is stored in the second structure to the output table by removing the input duplicates from the output table and applying the input duplicates and the discarded input rows to matching original rows in the output table to update the matching original rows.

15. The article of manufacture of claim 14, wherein the operations for determining whether to add the data for one or more discarded input rows in the third structure to the second structure further comprise:

searching for discarded input rows in the third structure with corresponding rows in the second structure and in the output table to identify potential input duplicates; and applying conditions to the discarded input rows that are potential input duplicates.

16. The article of manufacture of claim 15, wherein the operations for processing of the input data further comprise at least one of order sensitive processing and order insensitive processing.

17. A computer system having at least one program for processing input data comprising:

receiving multiple input rows to be loaded into a first structure, wherein the first structure is an output table;

processing each input row of the multiple input rows to classify each input row as one of an insert row and an update row, wherein input duplicates are appended to the first structure and index entries for the input duplicates are stored in a second structure, wherein an insert row is a row to be added to the first structure and an update row is an update to an existing row in the first structure, wherein input duplicates are duplicate input rows having a same primary key value, and wherein, of the input rows having the same primary key value, one is an original row; and after the multiple input rows have been processed,
automatically re-applying the input duplicates to the first structure by removing the input duplicates from the first structure and applying the input duplicates to matching original rows in the first structure to update the matching original rows; and merging index entries from the index entries stored in the second structure to a primary key index.

18. The computer system of claim 17, further comprising:
identifying duplicates in the index entries in the second structure; and
storing the identified duplicates in a third structure.

19. The computer system of claim 17, wherein the processing of the input data further comprises order insensitive processing of input duplicates.

20. The computer system of claim 17, wherein the processing of the input data further comprises order sensitive processing of input duplicates.

21. The computer system of claim 17, further comprising:
when an input duplicate is characterized as an update row, updating a corresponding row in the output table.

22. A computer system having at least one program for processing input data, comprising:

loading one or more input rows into an output table, wherein input duplicates are appended to the output table, index entries for the input rows are stored in a first structure and discarded input rows are stored in a third structure, wherein the discarded input rows are input rows that are rejected based on a condition, wherein input duplicates are duplicate input rows having a same primary key value, and wherein, of the input rows having the same primary key value, one is an original row;

periodically interrupting the loading of the one or more input rows to perform an index merge, wherein input duplicates for which corresponding index entries in the first structure are not added to an index are stored in a second structure;

determining whether to add data for one or more discarded input rows in the third structure to the second structure;

when it is determined that the data for one or more discarded input rows in the third structure are to be added to the second structure, adding the data for the discarded input rows to the second structure; and automatically reapplying input duplicates and discarded input rows for which data is stored in the second structure to the output table by removing the input duplicates from the output table and applying the input duplicates and the discarded input rows to matching original rows in the output table to update the matching original rows.

23. The computer system of claim 22, wherein determining whether to add the data for one or more discarded input rows in the third structure to the second structure further comprises:

searching for discarded input rows in the third structure with corresponding rows in the second structure and in the output table to identify potential input duplicates; and applying conditions to the discarded input rows that are potential input duplicates.

24. The computer system of claim 22, wherein the processing of the input data further comprises at least one of order sensitive processing and order insensitive processing.

* * * * *